(12) United States Patent
Jen

(10) Patent No.: US 6,336,549 B1
(45) Date of Patent: Jan. 8, 2002

(54) MULTI-LEVEL CONVEYER

(76) Inventor: Hsieh Chuan Jen, Yan-si-Wou 35-2, Houkou, Hsinchu (TW)

( * ) Notice: Subject to any disclaimer, the term of this patent is extended or adjusted under 35 U.S.C. 154(b) by 0 days.

(21) Appl. No.: 09/450,708

(22) Filed: Nov. 29, 1999

(51) Int. Cl.$^7$ .............................................. B65G 17/18
(52) U.S. Cl. ..................................................... 198/800
(58) Field of Search ................................ 198/800, 813, 198/834, 482, 380, 796

(56) References Cited

U.S. PATENT DOCUMENTS 4,346,803 A * 8/1982 Haessler .................... 198/800
4,378,873 A * 4/1983 Cloudy ....................... 198/800

* cited by examiner

Primary Examiner—Kenneth W. Noland
(74) Attorney, Agent, or Firm—W. Wayne Liauh

(57) ABSTRACT

A multi-level conveyer mainly includes a plurality of carrier units connected at front and rear ends to two parallelly extended chains, and chain wheels provided at predetermined positions for the chains to pass there and turn to form more than one level of horizontal conveyance path on the conveyer. The multi-level conveyer can be mounted in a room with limited area while providing sufficient conveyance length and time to meet requirements in most drying operations and largely reduce power consumption required in drying.

3 Claims, 4 Drawing Sheets

MULTI-LEVEL CONVEYER

BACKGROUND OF THE INVENTION

The present invention relates to a multi-level conveyer that requires only limited space while providing increased conveyance length and time, such that articles conveyed on the conveyer can be sufficiently dried during conveyance.

It is known that most pulp-molded articles and baking-finished products must be dried during their manufacturing process. Particularly, the pulp-molded articles require sufficiently long drying to complete the production thereof. Articles or products having larger volume would require longer time of drying. To sufficiently dry articles or products, it necessitates a drying room with sufficient area and a surface conveyer with sufficient conveyance length, so that articles or products on the conveyer could be dried for a long enough time and fully meet the required dryness when they are removed from the conveyer.

For a surface conveyer, both the structural design thereof and the area of drying room for accommodating the conveyer limit the conveyance length available on the conveyer. Following are some disadvantages of the surface conveyer:

1. The drying room for accommodating the surface conveyer must be considerably large in area:
   To successfully perform the drying, the surface conveyer must be able to provide a long conveyance path and therefore requires large drying room to accommodate the long conveyer, and costs for such large drying room will be inevitably high.
2. Higher power consumption is required for the surface conveyer in a large drying room:
   With a large drying room, higher power must be consumed for the whole drying room to reach a minimum working temperature to perform the drying well.

It is therefore tried by the inventor to develop a multi-level conveyer to eliminate drawbacks existing in the conventional surface conveyer.

SUMMARY OF THE INVENTION

A primary object of the present invention is to provide a multi-level conveyer that can be mounted in a limited space while provides conveyance length long enough for sufficient drying operation with reduced power consumption.

The multi-level conveyer according to the present invention includes a plurality of serially arranged carrier units, front and rear ends of which being connected to two parallelly extended chains. Chain wheels are provided at predetermined positions in the conveyer. When the chains pass the chain wheels, they turn by 90 degrees to move into a higher or a lower level of the conveyer. The carrier units are conveyed from a bottom level of the conveyer to a top level and then moved downward to sequentially pass every lower levels and the bottom level to complete one cycle of conveyance on the conveyer.

In the multi-level conveyer of the present invention, the carrier unit is disposed between the two parallel chains by separately connecting two ends of a central pivotal shaft of the carrier unit to the two chains, such that when the carrier unit is moved by the chains to pass any chain wheel and turns, the central pivotal shaft revolves relative to the carrier unit to keep the latter in a horizontal position.

Retainer walls are provided in the multi-level conveyer of the present invention at outer side of every turns and vertical conveyance paths to contact with outer sides of the carrier units passing the turns or the vertical paths, preventing the carrier units from rotating at the turns due to an inertia force or tilting at the vertical paths.

The carrier units of the present invention are provided at two lateral sides near two ends thereof with a pulley support each. The pulley support each includes a vertical bar having two pulleys mounted to upper and lower ends thereof. The pulleys rotatably contact with the retainer walls when the carrier unit passes a turn or a vertical path and therefore reduce friction between the carrier unit and the retainer wall.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
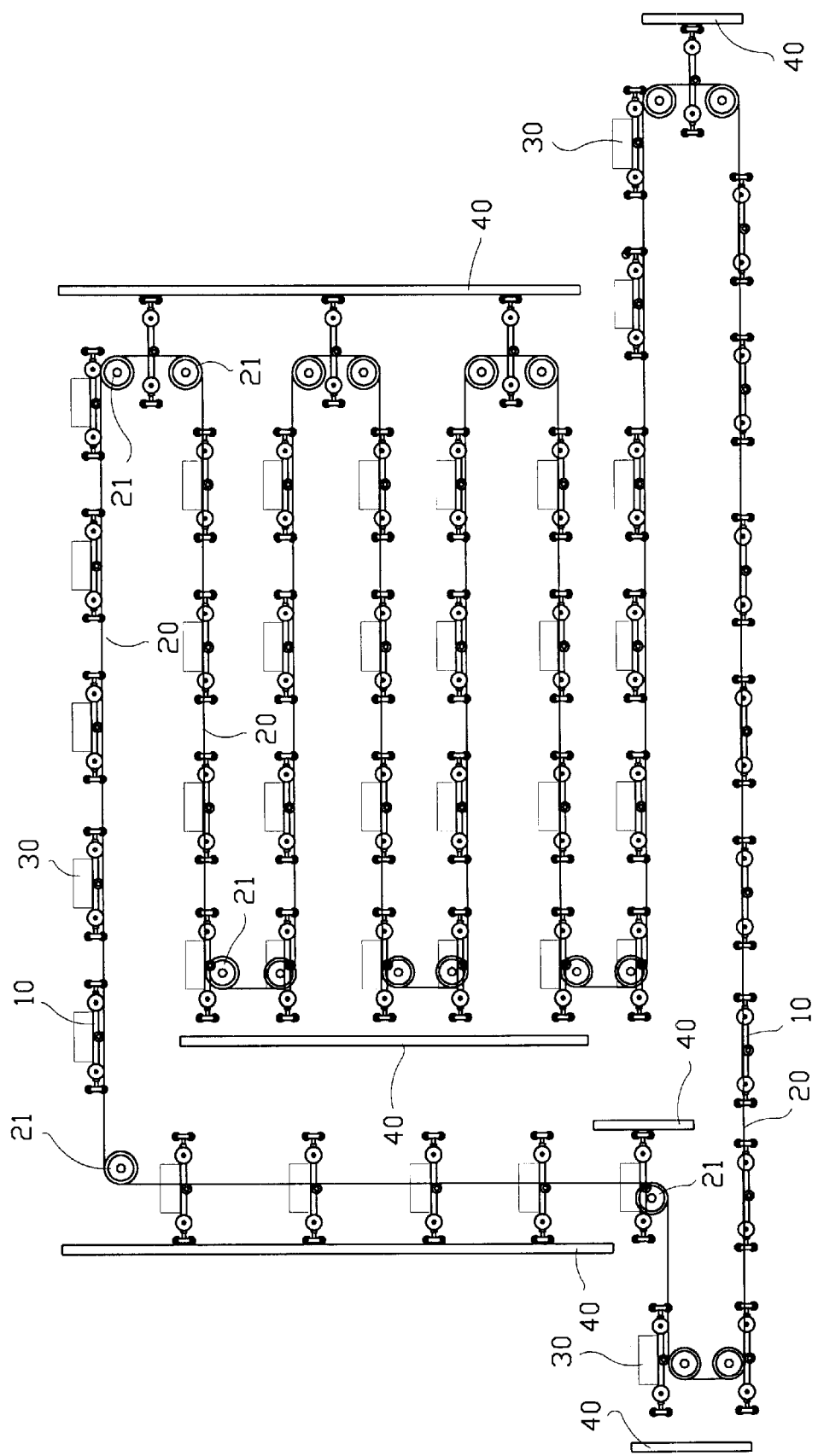
FIG. 1 is an elevation of a multi-level conveyer according to a preferred embodiment of the present invention.

Please refer to FIG. 1 in which a multi-level conveyer according to a preferred embodiment of the present invention is shown. The multi-level conveyer includes a plurality of serially arranged carrier units 10 and two parallel chains 20 continuously extended to separately and correspondingly locate before front end and behind rear end of the carrier units 10.

Figure 2:
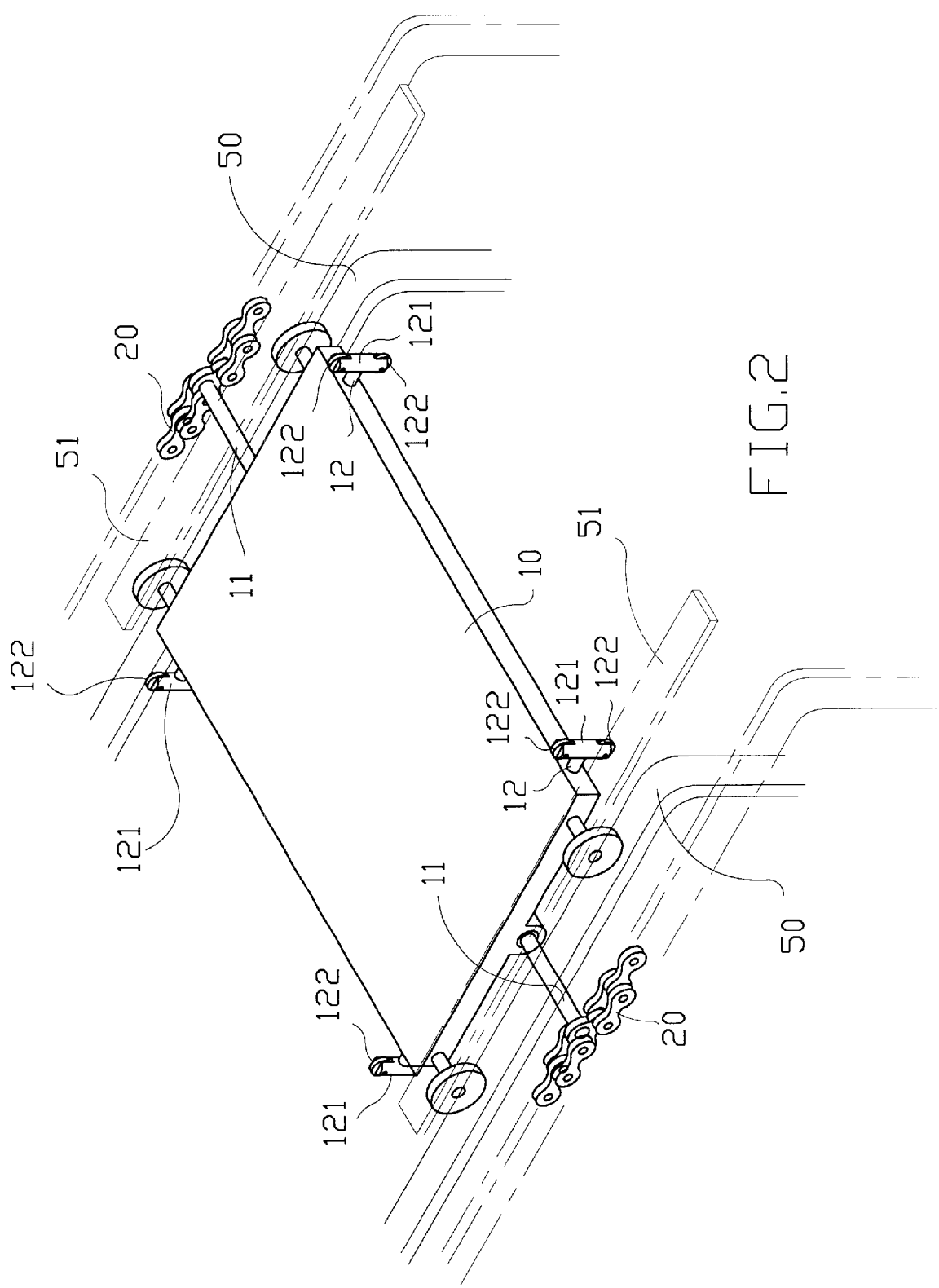
FIG. 2 is a fragmentary and enlarged perspective of a carrier unit of the multi-level conveyer of the present invention.

Please refer to FIG. 2 that is a fragmentary and enlarged perspective of one carrier unit 10. As shown, the carrier unit 10 includes a central pivotal shaft 11, two ends of which separately project from the front and the rear ends of the carrier unit 10 to connect to the two chains 20. Chain wheels 21 are provided in the conveyer at predetermined positions for the chains 20 to pass there and turn to a higher or a lower level. The chain wheels 21 and the chains 20 cooperate to move the carrier units 10 connected to the chains 20 from a bottom level of the conveyer to a top level thereof and then from the top level to sequentially pass every lower levels until the carrier units 10 reach the bottom level again to complete one cycle of conveyance on the multi-level conveyer.

As can be seen from FIG. 1, the chains 20 turn by 90 degrees in their moving direction when they pass a first chain wheel 21. After the chains 20 have passed a second chain wheel 21 next to the first chain wheel 21, their moving direction has turned by 180 degrees. At this point, the carrier units 10 are moved to a next higher or lower level on the multi-level conveyer. That is, by provision of chain wheels 21 at proper positions, the two continuous chains 20 and the carrier units 10 can together form a conveyer providing a multi-level conveyance path. A distance or height between any two levels of the conveyer may be properly decided depending on working pieces 30 to be positioned on the carrier units 10.

Figure 3:
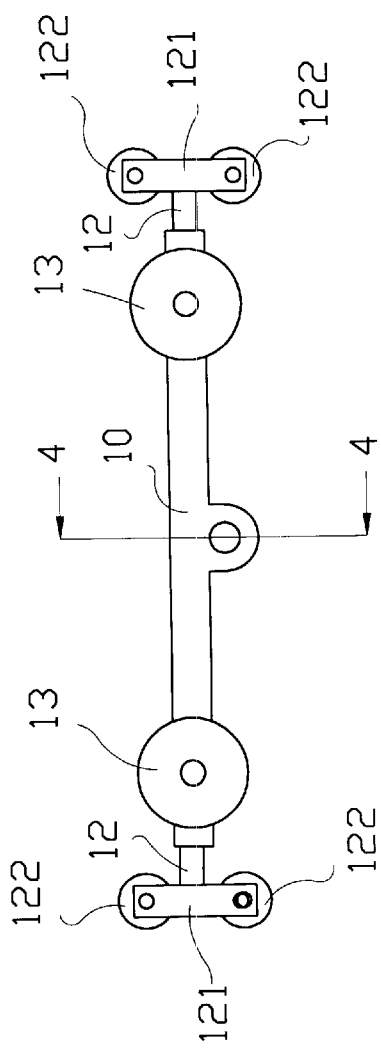
FIG. 3 is a front elevation of the carrier unit of FIG. 2.
Figure 4:
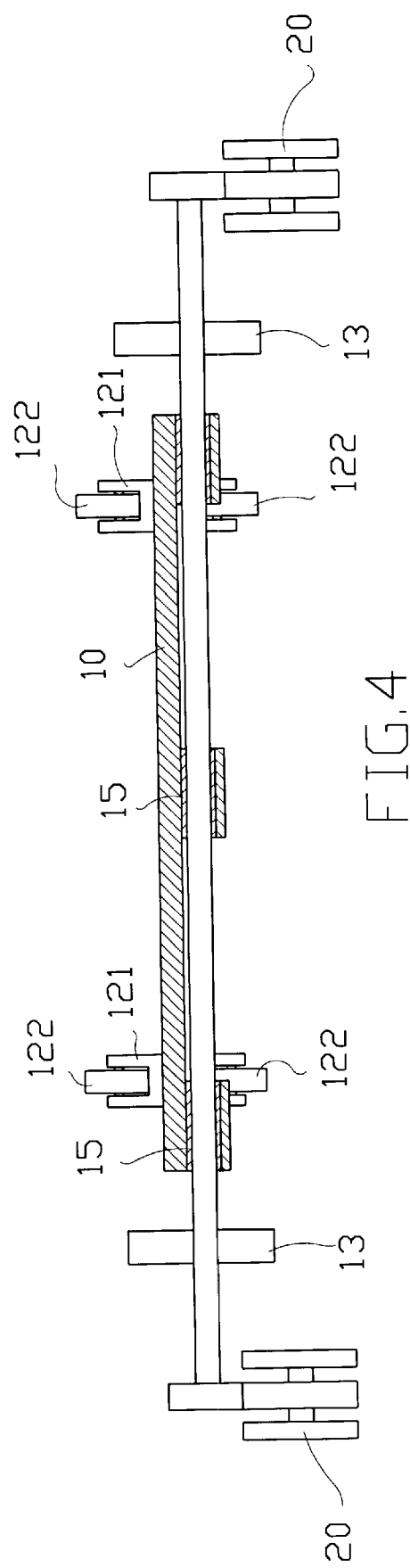
FIG. 4 is a sectional view of the carrier unit taken on line 4—4 of FIG. 3.

FIG. 3 is a front elevation of the carrier unit 10, and FIG. 4 is a sectional view of the carrier unit 10 taken on line 4—4 of FIG. 3. As shown in FIG. 4, the pivotal shaft 11 of the carrier unit 10 has bushings 15 spaced around it before it is extended through a long hole provided on the carrier unit 10. Therefore, the shaft 11 can revolve on its axis inside the long hole of the carrier unit 10. When the chains 20 pass one of the chain wheels 21 and turn, the pivotal shaft 11 connected thereto revolves at the turning while it moves forward along the chains 20. This allows the carrier unit 10 to which the pivotal shaft 11 is connected to always maintain in a horizontal position without dropping working pieces 30 positioned thereon.

Figure 5:
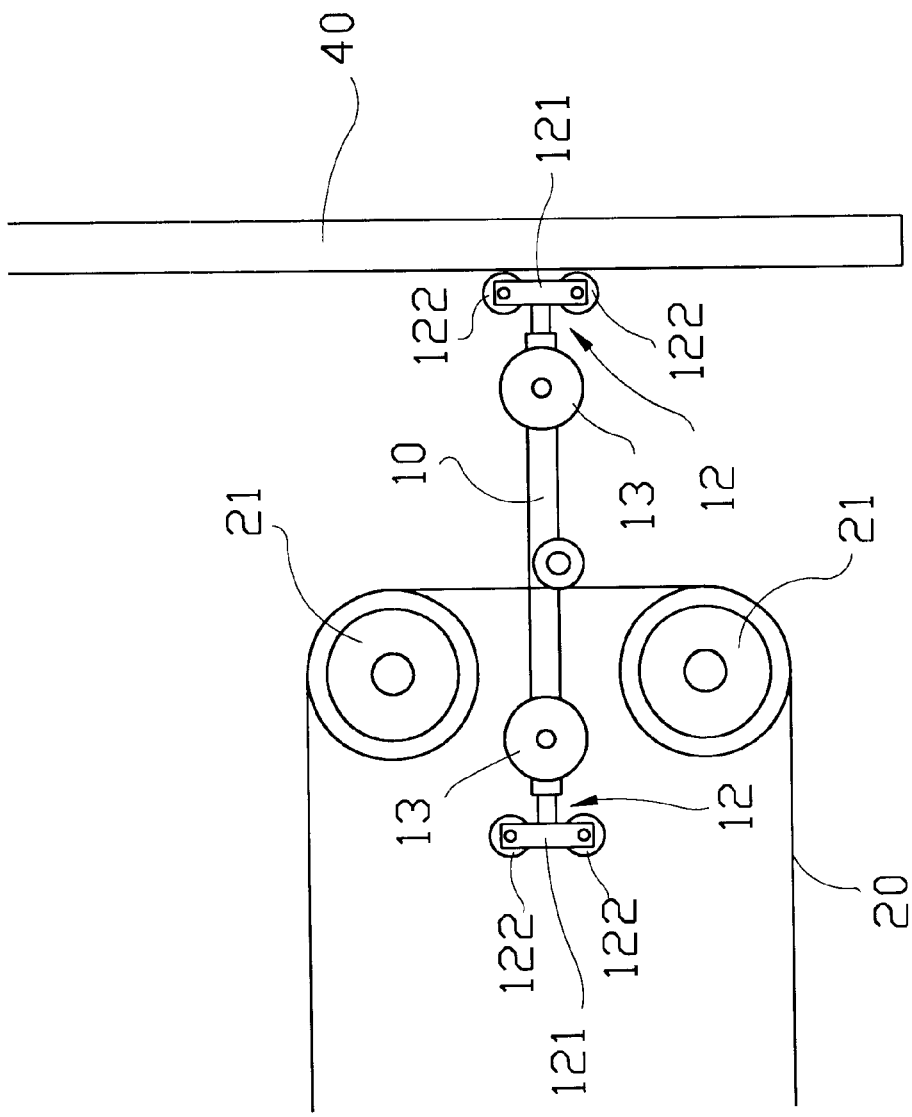
FIG. 5 is a fragmentary and enlarged view of the multi-level conveyer of FIG. 1 showing a carrier unit thereof passing a turn in the conveyer with its outer side abutting on a retainer wall.

Please refer to FIGS. 1 and 5 at the same time. Retainer walls 40 are provided at every turns of the multi-level conveyer to contact with an outer side (either a left or a right side) of the carrier unit 10 passing the turns to a higher or a lower level of the conveyer. The retainer wall 40 offsets an inertia force of the moving carrier unit 10 at the turning point, so that the carrier unit 10 would not rotate while turning. Moreover, retainer walls 40 are also provided along vertical conveyance paths in the multi-level conveyer to contact with one side of the carrier units 10 sequentially moving upward or downward along the chains 20, preventing the carrier units 10 from rotating or tilting over during moving vertically.

Please now refer back to FIG. 2. The carrier unit 10 is provided near front and rear ends of two lateral sides thereof with a pulley support 12 each. The pulley support 12 each includes a vertical bar portion 121. Two pulleys 122 are separately mounted to upper and lower ends of the vertical bar portion 121. When the carrier unit 10 passes by a retainer wall 40, the upper and the lower pulleys 122 at one side thereof facing toward the retainer wall 40 would rotatably contact the retainer wall 40 to reduce a friction between the carrier unit 10 and the retainer wall 40. Furthermore, contact of the pulleys 122 with the retainer wall 40 is also helpful in maintaining the carrier unit 10 in a stable horizontal position.

The carrier unit 10 is also provided at its front and rear ends separately with two spaced rollers 13 that project from the front and the rear end of the carrier unit 10. In a normal condition, rollers 13 provided at two ends of the carrier unit 10 separately rotatably move on and along a lower rail 50. However, two additional sections of upper rails 51 are provided near each turn on the multi-level conveyer corresponding to the lower rails 50. When the carrier unit 10 moves to a turn with its rollers 13 located at outer side thereof becoming separated from the lower rails 50, the rollers 13 would still be guided by the upper rails 51 without causing a tilted carrier unit 10. The retainer walls 40 provided to one side of the vertical conveyance paths also function like rails.

As can be clearly seen from FIG. 1, the multi-level conveyer of the present invention includes a bottom and a second level that have a transversely extended distance longer than that of other higher levels to project two ends from the higher levels, so that working pieces 30 may be conveniently positioned on or removed from the carrier units 10 at the second level.

With the above arrangements, the multi-level conveyer of the present invention provides sufficient conveying length and time for working pieces on the conveyer to be fully dried while it can be mounted in a considerably small drying room. The multi-level conveyer of the present invention is therefore most economical and practical for use in drying rooms.

What is claimed is:

1. A multi-level conveyer comprising a plurality of serially arranged carrier units and two parallel chains continuously extended to separately and correspondingly locate before front end and behind rear end of the carrier units;
   each of said carrier units including a central pivotal shaft, two ends of which separately projecting from said front and said rear ends of said carrier unit to connect to said two chains;
   chain wheels being provided in said conveyer for said chains to pass therethrough and turn, so as to provide more than one level of horizontal conveyance path for said conveyer, and said chain wheels and said chains cooperating to move said carrier units serially connected to said chains from a bottom level of said conveyer to a top level thereof and then from said top level to sequentially pass every lower level until said carrier units reach said bottom level again to complete one cycle of conveyance with said multi-level conveyer; and
   a retainer wall provided at every turn and vertical conveyance path in said conveyer, such that said carrier units, when moved to said turns and said vertical conveyance paths, will contact at an outer side of said retainer walls to avoid rotation or tile.

2. A multi-level conveyer comprising a plurality of serially arranged carrier units and two parallel chains continuously extended to separately and correspondingly locate before front end and behind rear end of the carrier units;
   each of said carrier units including a central pivotal shaft, two ends of which separately projecting from said front and said rear ends of said carrier unit to connect to said two chains;
   chain wheels being provided in said conveyer for said chains to pass therethrough and turn, so as to provide more than one level of horizontal conveyance path for said conveyer, and said chain wheels and said chains cooperating to move said carrier units serially connected to said chains from a bottom level of said conveyer to a top level thereof and then from said top level to sequentially pass every lower level until said carrier units reach said bottom level again to complete one cycle of conveyance with said mulfi-level conveyer;
   wherein each of said carrier units is provided near front and near ends of each of a left side and a right side of said carrier unit with a pulley support, and said pulley support each including a vertical bar and two pulleys separately mounted to upper and lower ends of said vertical bar.

3. A multi-level conveyer comprising a plurality of serially arranged carrier units and two parallel chains continuously extended to separately and correspondingly locate before front end and behind rear end of the carrier units;
   each of said carrier units including a central pivotal shaft, two ends of which separately projecting from said front and said rear ends of said carrier unit to connect to said two chains;
   chain wheels being provided in said conveyer for said chains to pass therethrough and turn, so as to provide more than one level of horizontal conveyance path for said conveyer, and said chain wheels and said chains cooperating to move said carrier units serially connected to said chains from a bottom level of said conveyer to a top level thereof and then from said top level to sequentially pass ever lower level until said carrier units reach said bottom level again to complete one cycle of conveyance with said multi-level conveyer;

wherein:

each of said carrier units is provided at said front and said rear end thereof separately with two spaced rollers, two continuous lower rails are provided in said conveyer such that said rollers at two ends of said carrier units rotatably moving on and along said lower rails, and upper rails are additionally provided in said conveyer near every turn such that when said carrier units move to said turns with their rollers located at an outer side thereof becoming separated from said lower rails, said rollers will still be guided by said upper rails without causing said carrier units to tilt.

\* \* \* \* \*